United States Patent

Asahi et al.

[11] Patent Number: 6,007,280
[45] Date of Patent: Dec. 28, 1999

[54] PRODUCTION METHOD OF PATTERN FOR CASTING

[75] Inventors: Kazuhiro Asahi; Shigetoshi Masuzawa; Takeyoshi Otsu; Kouji Sawada, all of Kanagawa-ken, Japan

[73] Assignee: Nissan Motor Co., Ltd., Kanagawa-ken, Japan

[21] Appl. No.: 09/019,102

[22] Filed: Feb. 5, 1998

[30] Foreign Application Priority Data

Feb. 5, 1997 [JP] Japan ................... P9-022962

[51] Int. Cl.$^6$ ....................................... B23C 3/00
[52] U.S. Cl. ................................. 409/132; 364/474.24
[58] Field of Search ........................ 409/132, 131, 409/164, 198, 80; 364/474.24

[56] References Cited

U.S. PATENT DOCUMENTS

| | | | |
|---|---|---|---|
| 3,635,124 | 1/1972 | Parsons | 409/132 |
| 4,907,164 | 3/1990 | Guyder | 364/474.24 |
| 5,011,345 | 4/1991 | Nishigai et al. | 409/132 |
| 5,072,782 | 12/1991 | Namba et al. | |
| 5,207,541 | 5/1993 | Westerman et al. | 409/132 |
| 5,493,767 | 2/1996 | Susnjara | 409/132 |
| 5,532,933 | 7/1996 | Nakata | 364/474.24 |
| 5,595,463 | 1/1997 | Takegahara et al. | 409/132 |
| 5,662,566 | 9/1997 | Marxrieser et al. | 409/132 |
| 5,836,729 | 11/1998 | Fink | 409/132 |

*Primary Examiner*—Daniel W. Howell
*Attorney, Agent, or Firm*—McDermott, Will & Emery

[57] ABSTRACT

A method for improving dimensional accuracy of a casting pattern. A division block used to form the casting pattern is fixed on a block fixing surface of an NC machine and then the front surface is processed, leaving a stiffness holding portion at a bottom-most portion of the division block. The division block is then turned over and the rear surface is processed, removing the stiffness holding portion. The stiffness holding portion has sufficient thickness to secure stiffness of portions surrounding a through portion, enabling withstanding of a cutting force applied to the rear surface when the division block is turned over and the rear surface processed. Thus, a deviation in position of the tool during processing of the through hole on the rear surface from that of processing of the through hole on the front surface is suppressed.

9 Claims, 6 Drawing Sheets

PRODUCTION METHOD OF PATTERN FOR CASTING

FIELD OF THE INVENTION

This invention relates to a production method of a pattern for casting, in particular, a pattern for use in casting of a die such as a press die based on full mold casting process.

BACKGROUND OF THE INVENTION

Conventionally, for producing the aforementioned pattern for casting (hereinafter referred to as "casting pattern"), the configuration of the pattern is defined as three dimensional CAD (computer aided design) system data. The data is then divided into a plurality of parts, each representing a division block with an appropriate thickness. This allows the entire pattern to be machined with ease. Specifically, as shown in FIGS. 1A through 1D, each casting pattern is worked from a block A (FIG. 1A) by a numerical control machine (hereinafter referred to as "NC machine") in such a way that the casting pattern, as divided into a plurality of parts (hereinafter referred to as "division block"), will be subject to an independent machining process, e.g. milling process. For the machining work, it is necessary to create a program with numerical control data (hereinafter referred to as "NC data") which establishes the numerical control of the NC machine. The program is created, as stated above, base upon three-dimensional data of the division block Aa. In the illustrated examples, the machining proceeds along a contour of each division block Aa, in accordance with the program, to form a pocket in the block. Generally, the division block Aa of the casting pattern is made of expanded polystyrene or of styrol resin.

Next, as shown in FIG. 1B, the division block Aa is fixed on a block fixing surface 50 of a working table of the NC machine via a jig (not shown). According to the programmed NC data, a front surface of the division block Aa is processed or profiled by a cutting tool 51 having a protruding blade length S+α which is slightly longer than the thickness S of the division block Aa and a blade length S+β which is slightly shorter than the protruding blade length S+α (blade length has to be longer than the block thickness).

Then, after the processing of the front surface is finished, the division block Aa is turned over on the block fixing surface 50 and it is fixed again to the block fixing surface 50 of the working table of the NC machine. Then, as shown in FIG. 1D, like the front surface, the rear or reverse surface of the division block Aa is cut, based on the programmed NC data, to obtain a predetermined shape. By combining or assembling the plural division blocks Aa, each having predetermined shape which is produced in a similar manner, the casting pattern is created.

However, because there is insufficient stiffness around the through hole portion B, processing of the front surface is difficult. Specifically, when the division block is turned over and processing of the rear surface begins, the position of the milling tool during processing of the through hole on the rear surface deviates from that of processing of the through hole on the front surface so that a high dimensional accuracy of the through hole cannot be assured which might lead to a formation of steps within the hole.

Further, if the number of the division blocks Aa is decreased and the thickness of each division block Aa increased, the blade length of the cutting tool 51 will increase and will not correspond to high speed processing requirements.

Further, because pockets are produced on the block and the processing is executed along the contour of the division block Aa, a large number of steps are required to make or to produce the program on a numerical control tape (hereinafter referred to as "NC tape"). Moreover, as shown in FIG. 1C, when a thin rib C is to be formed, high dimensional accuracy cannot be assured because of vibration which occurs during the machining process.

These problems in the conventional production method of a casting pattern have been left unsolved up to now.

SUMMARY OF THE INVENTION

The present invention has been made to solve the aforementioned problems of the conventional production method of a casting pattern. In production of a casting pattern from a plurality of expanded polystyrene blocks (hereinafter referred to as "division model block"), each division model block undergoes a successive cutting process on its front and rear surfaces. It therefore is an object of the invention to provide a cutting method which minimizes a deviation in position of the machining tool which may occur when the block is turned over for processing the rear surface after the front surface is processed.

Another object thereof is to provide a method which can realize machining, at high speed, of a division model block having a large thickness.

A still another object of the invention is to provide a production method of a casting pattern which is capable of realizing a large reduction in the number of steps required for producing a program on the NC tape when using a NC machine as a processing machine.

A further object of the invention is to provide a production method of a casting pattern capable of significantly improving dimensional accuracy of thin ribs which are formed.

In a production method for the casting pattern according to a first aspect of the invention, when the division model block is turned over and both the front and rear surfaces of the division model block are successively cut so as to produce a casting pattern, a stiffness holding portion is intentionally left when processing the front surface to give a high stiffness to the division model block. Therefore, it is possible to suppress a deviation in position of the tool which may occur when the rear surface is processed subsequent to processing of the front surface.

In the production method for the casting pattern according to a second aspect of the invention, a tool having a long protruding length is used in a second cutting processing so that a division model block having a large thickness can be processed at a high speed.

In the production method for the casting pattern according to a third aspect of the invention, as compared to a conventional pocket processing method in which processing is made along the contour, the number of steps for instructions of processing area decreases which means the entire distance travelled by a tool is minimized (detailed later). Thus, production of the program on the NC tape is simplified. Additionally, because the cutting processing is carried out along a line at substantially 45° relative to the center line of the model block, a vibration which may occur when a thin rib is formed is suppressed.

In the production method for the casting pattern according to a fourth aspect of the invention, cutting paths which go beyond a protruding portion, such as the rib, are minimized so that waste movement, while processing, and shifting of the cutting tool are suppressed.

In the production method for the casting pattern according to a fifth embodiment, processing and shifting of the cutting tool in a direction perpendicular to the division inclined cutting path are minimized, and further, the side faces of a protruding portion, such as a rib, are also cut. Therefore, processing residue is minimized.

In the production method for the casting pattern according to the first aspect of the invention, when the division model block, after having been profiled on its front surface, is turned over and the rear surfaces of the division model block is subsequently cut so as to produce a division block, it is possible to suppress a deviation in position which may occur when the block is turned over for processing the rear surface by intentionally leaving a stiffness holding portion when processing the front surface. Therefore, the dimensional accuracy can be remarkably improved.

In the production method for the casting pattern according to the second aspect of the invention, the cutting tool having a long protruding length is used in the second cutting processing. Therefore, a division model block having a large thickness can be processed at a high speed.

In the production method for the casting pattern according to the third aspect of the invention, as compared to the conventional pocket processing method in which processing is made along the contour, the number of steps or instructions and traveling path of the tool can be reduced. Therefore, the processing NC data can be produced easily while the vibration which may occur when a thin rib is formed can be suppressed. Therefore, improvement of the processing accuracy for the thin rib can be achieved.

In the production method for the casting pattern according to the fourth aspect of the invention, unnecessary processing and unnecessary traveling of the cutting tool can be suppressed. Therefore, the processing time can be reduced.

In the production method for the casting pattern according to the fifth aspect of the invention, reduction of the processing time and improvement of the processing quality can be achieved.

Still other objects and advantages of the present invention will become apparent upon reference to the following drawings, specification and appended claims.

DETAILED DESCRIPTION OF THE INVENTION

Hereinafter, the embodiments of the present invention will be described with reference to the accompanying drawings.

FIG. 2A to FIG. 6C show an embodiment of production method of a pattern for casting according to the present invention.

Figure 3A:
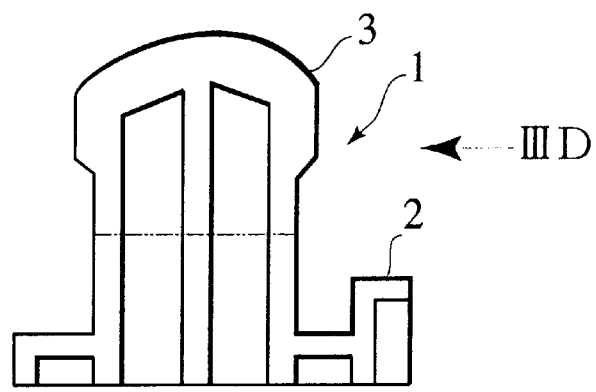
FIG. 3A is a sectional view of the casting pattern with each division model assembled to form one pattern according to the production method of the casting pattern of the present invention.
Figure 3B:
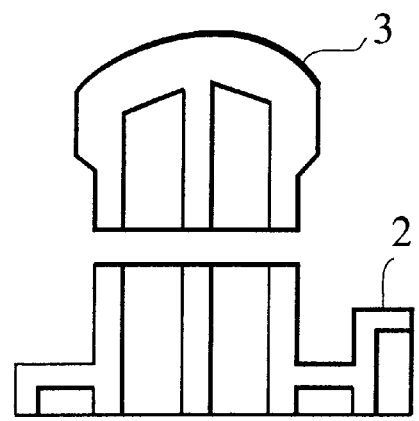
FIG. 3B is a sectional view of a state in which the casting pattern shown in FIG. 3A is divided to two models.
Figure 3C:
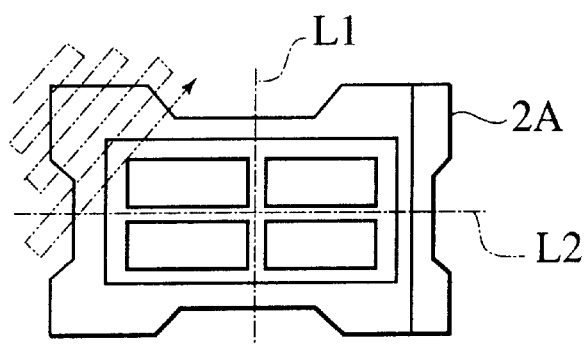
FIG. 3C is an explanatory view of a scan processing method.

As shown in FIG. 3A, a casting pattern 1 comprises two casting patterns (hereinafter referred to as "division pattern") 2, 3, which are joined together after each block has been machined and finished. For example, the division pattern 2 is produced, as shown in FIG. 3C, by cutting a generally rectangular division model block 2A having a sufficient size for production of the division pattern 2. The rectangular division model block 2A is made of expanded polystyrene or of styrol resin. Therefore, the division patterns 2, 3 evaporate when the casting operation proceeds.

Figure 3D:
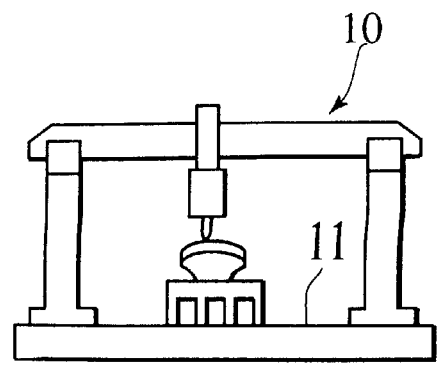
FIG. 3D is a front view of a NC cutting machine for use in production of the casting pattern.

To produce the casting pattern 1, three dimensional data of the casting pattern 1 are produced for programming numerical control data. Then, as shown in FIG. 3B, the casting pattern 1 is divided into a plurality of division patterns (two pattern blocks 2, 3 in this example) as three dimensional data in a manner such that thickness of the division patterns 2, 3 is appropriate to be cut by a cutting tool. Then the three dimensional data for cutting the division patterns 2, 3 from the rectangular division model blocks 2A are produced. Referring to FIG. 3D, a program with numerical control data (hereinafter referred to as "NC data") is produced, based on the three dimensional data, for controlling an NC cutting machine 10 (a kind of a planomilling machine, for example) to cut the division model blocks 2A on a block fixing surface or table 11. The NC cutting machine is controlled so as to scan the block surface at substantially a 45° line or path with respect to the center lines L1, L2 of the division model block 2A, as shown in FIG. 3C.

Figure 1A:
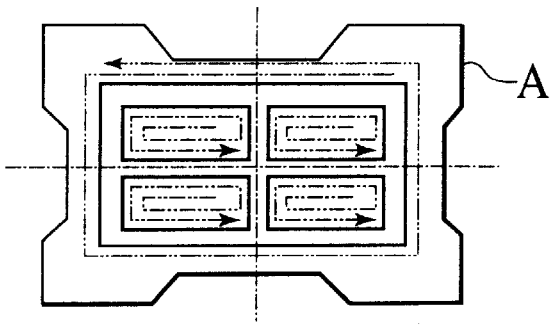
FIG. 1A is a view for explaining a pocket processing process of a division block performed by a conventional production method of a casting pattern.
Figure 1B:
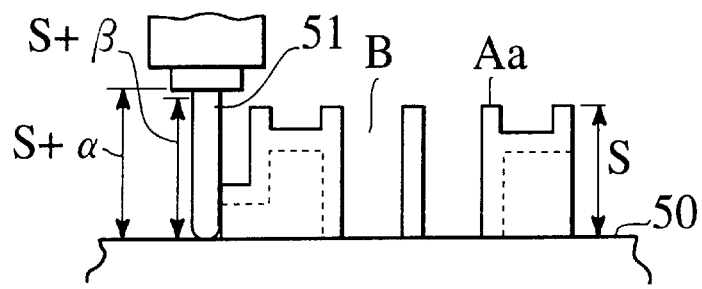
FIG. 1B is a cross-sectional view for explaining a cutting state of the front surface of the division block.
Figure 1C:
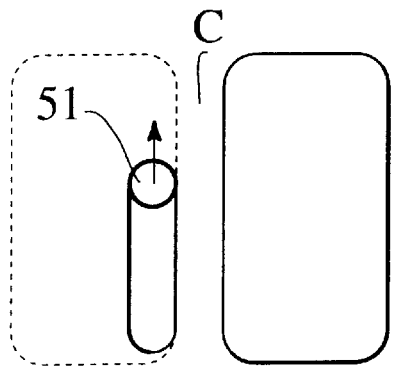
FIG. 1C is a plan view showing a cutting state near a rib of the division block.
Figure 1D:
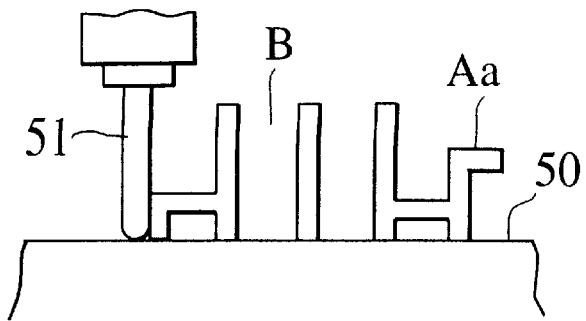
FIG. 1D is a cross-sectional view for explaining a cutting state of the rear surface of the division block.
Figure 2A:
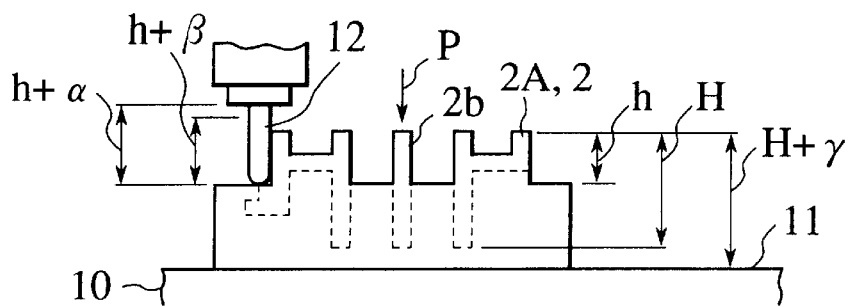
FIG. 2A is a side view of a division model for explaining a first cutting stage in which a front surface is being profiled according to an embodiment of the production method of a casting pattern of the present invention.

Next, as shown in FIG. 2A, a division model block 2A is fixed on the block fixing surface 11 using an appropriate fixing jig (not shown). Utilizing the produced NC data, a first cutting stage of the front surface of the division model block 2A is effected, cutting up to a maximum cutting depth h, wherein h is substantially one half of the thickness H of the division model block 2A.

For the first cutting stage, a cutting tool 12 is utilized. Cutting tool 12 has (i) a protruding length h+α from a chucked position which is slightly longer than half of the thickness H of the division model block 2A, and (ii) a blade length h+β which is slightly shorter than the protruding length h+α (α>0).

Figure 2B:
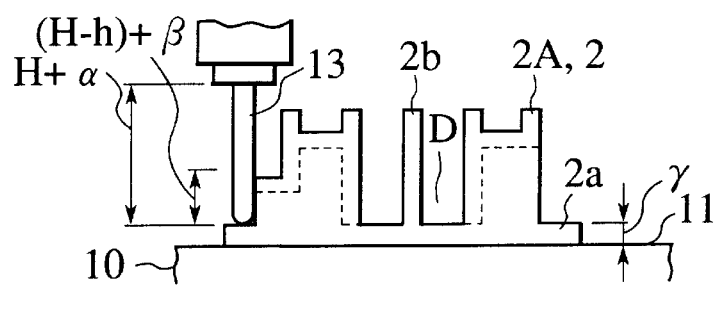
FIG. 2B is another side view for explaining a second cutting stage of the front surface machining process.

Then, as shown in FIG. 2B, the second cutting stage of the front surface of the division model block 2A is carried out by using a cutting tool 13. Cutting tool 13 has (i) a protruding length H+α which is longer than the thickness H of the division type block 2A, and (ii) a blade length (H-h)+β which is substantially half the protruding length H+α. At this time, a stiffness holding portion 2a is maintained at the bottom-most portion of the division model block 2A i.e., at a lower-most portion of the front surface, by leaving a redundant thickness γ uncut. The stiffness holding portion 2a secures stiffness of portions surrounding a through portion D, thereby enabling the cutting force which is applied when the division model block 2A is turned over and machined to be withstood.

Figure 2C:
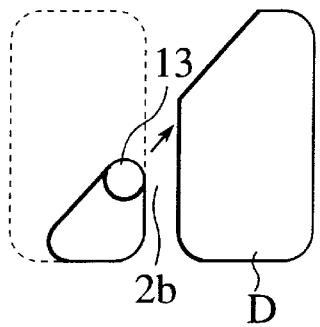
FIG. 2C is an explanatory view taken according to an arrow in FIG. 2A.
Figure 2D:
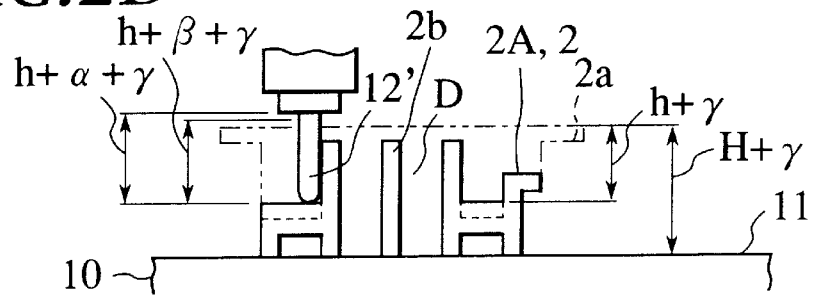
FIG. 2D is an explanatory view for explaining a first cutting stage of machining a rear surface of the division model.
Figure 2E:
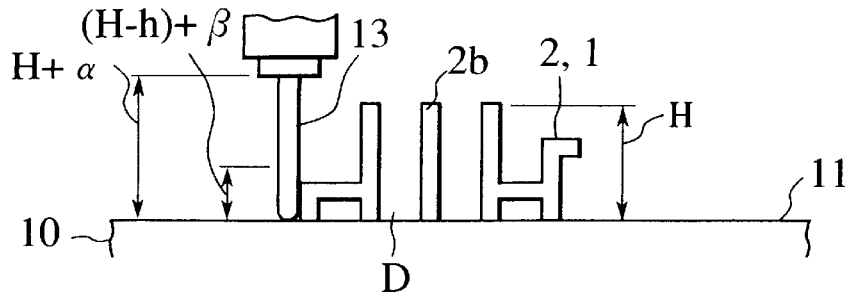
FIG. 2E is another explanatory view for explaining a second cutting stage of machining the rear surface of the division model.

When the processing of the front surface is completed, the division block 2A is turned over on the block fixing surface 11 and fixed again to the block fixing surface 11 of the NC cutting machine. After that, as shown in FIG. 2D, a first cutting stage of the rear surface of the division model block 2A is effected, cutting up to the maximum cutting depth h at the time of the surface processing, plus the thickness γ of the stiffness holding portion 2a. The cutting is carried out using a cutting tool 12' which has (i) a protruding length h+α+γ, and (ii) a blade length h+β+τwhere τ is the redundant thickness of the stiffness holding portion 2a. Then, as shown in FIG. 2E, by using the same cutting tool 13 as used for the second cutting stage of the front surface of the division model block 2A, the second cutting stage of the rear surface of the division model block 2A is carried out so as to produce a division pattern 2 of a predetermined shape. This division pattern 2 is combined with the division pattern 3 which is produced to have a predetermined shape in a similar manner as that of division pattern 2, so as to produce the entire casting pattern 1.

Next, the process in which the NC data instructing cutting paths of the cutting tools 12, 13 is determined for the aforementioned divided pattern, will be described. The explanations which follow are made only with reference to profiling a front surface of the division block. The profiling process of the reverse surface is similar.

Figure 4:
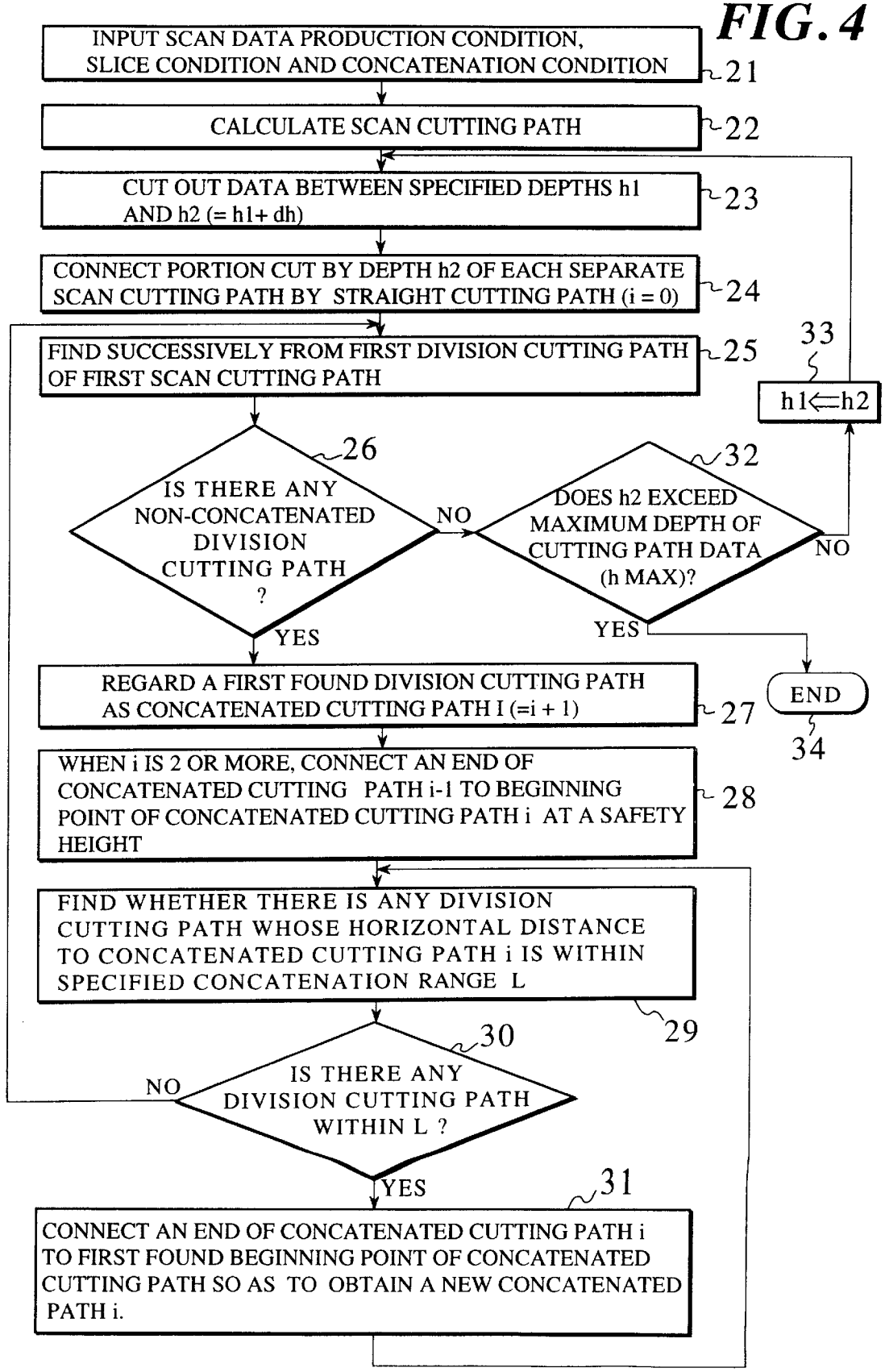
FIG. 4 is a flow chart for determining a cutting path according to the production method of the casting pattern of the present invention.
Figure 6A:
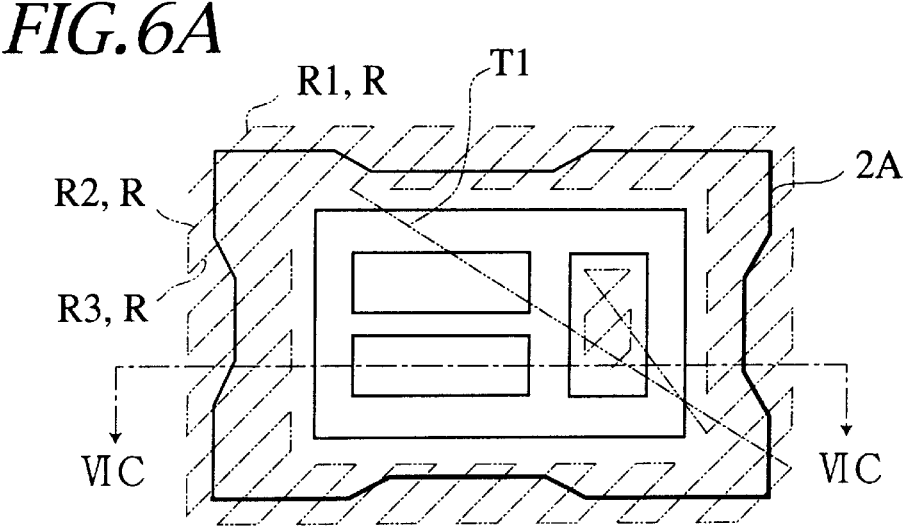
FIG. 6A is a plan view of a second stage cutting path for the division pattern, determined according to a flow chart.
Figure 6B:
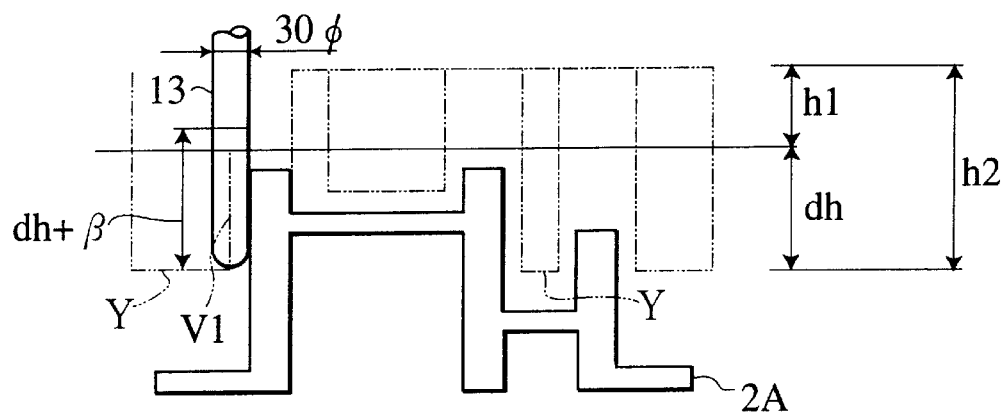
FIG. 6B is a cross-sectional view taken from the front of the first stage cutting path for the division pattern, determined according to the flow chart shown in FIG. 4.

Referring to FIG. 4, first, at step 21, after having defined three dimensional CAD data for an entire pattern, scan data production conditions (pitch, direction and the like), slice conditions (initial depth h1, slice pitch dh and the like) and concatenation conditions (concatenation range L, as later described more fully) are inputted in a computer (not shown). Further, at step 22, a scan cutting path is calculated so as to obtain scan produced NC data. At step 23, NC data between a first cutting depth h1 (set at a shallow depth) and a second cutting depth h2=h1+dh are cut out. As shown in FIG. 6B, at step 24, as for the respective scan cutting paths, parts cut out by the second cutting depth h2 are connected by a straight cutting path Y because there is no need for the milling tool to be retracted so as to move over the next path. The step (i=0), in which i is set to 0, is provided as part of initialization not directly related to concatenation of Y.

Figure 5:
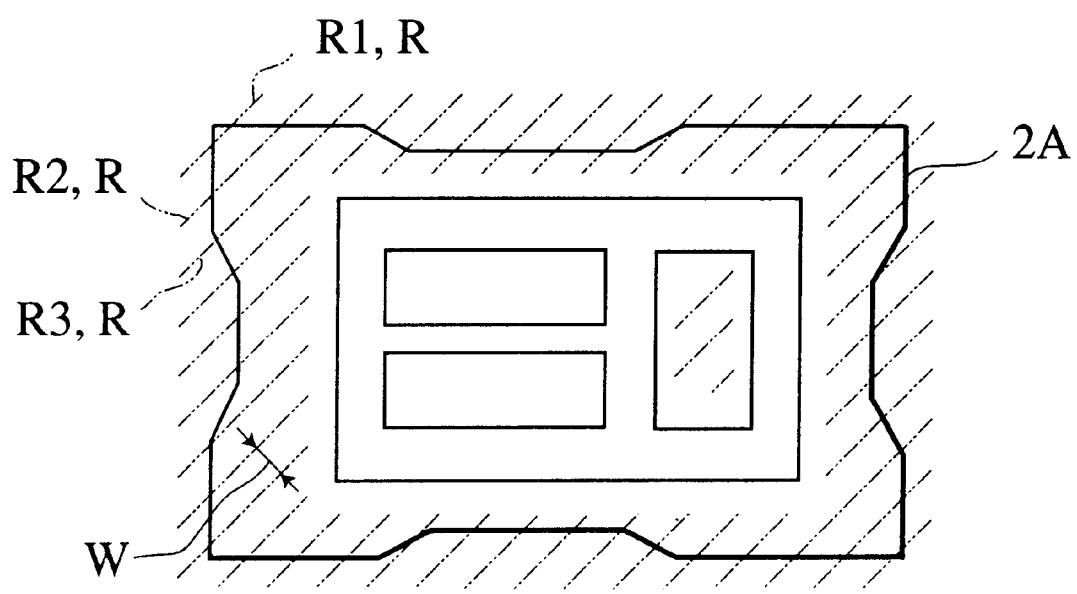
FIG. 5 is an explanatory view of a division inclined cutting path divided by cutting out a second processing range from scan processing NC data.

FIG. 5 illustrates cutting paths used at a second cutting stage and not for a first cutting stage. Referring to step 25 and FIG. 5, beginning with a first division inclined cutting path R1 out of the scan cutting paths arranged parallel to each other at a predetermined distance W (7 mm, for example), adjacent division inclined cutting paths which are respectively positioned within a predetermined concatenation range R2, R3, . . . are successively selected and connected so that all mutually adjacent inclined cutting paths are concatenated, forming a continuous cutting path. When it is determined at step 26 that there is a division inclined cutting path R which is not connected, at step 27, the division inclined cutting path R which has first been found is regarded as concatenated cutting path 1 (=i+1) because i was originally set to 0. Subsequently, at step 28, if there is already a concatenated cutting path i and i is 2 or more, as shown in FIG. 6A, an end of the concatenated cutting path i-1 is connected to a beginning point of the concatenated cutting path i to extend a traveling path by an intermediate traveling path T1 which includes a retreating path up to a safety height. This is one of the most important aspects of the tool path determination. After completing connecting all neighboring paths, if there is no other path left in its neighbor, path number is incremented and the tool retracted to come again to R1.

Figure 6C:
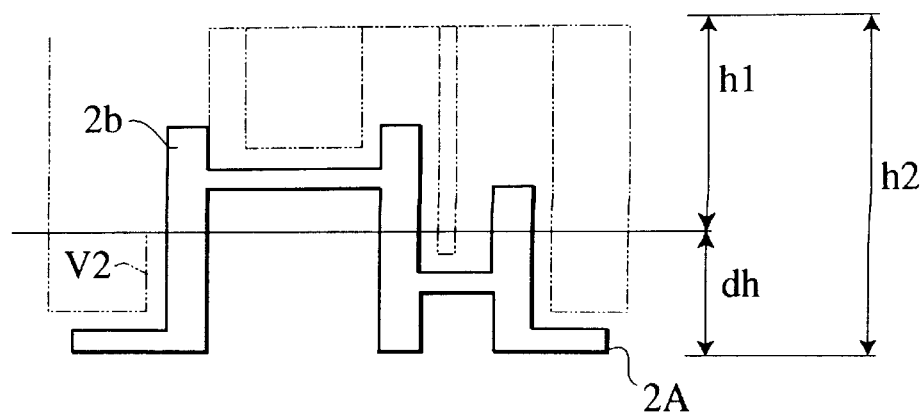
FIG. 6C is a cross-sectional view taken from the front of the second stage cutting path for the division pattern, determined according to the flow chart shown in FIG. 4.

At step 29, a check is made as to whether there is a division inclined cutting path R whose horizontal distance is within a specified concatenation range L from the current cutting path i out of next scan cutting paths. At step 30, if it is determined that there is any division inclined cutting path R within the specified concatenation range L, at step 31, an end of the current cutting path i is connected to a beginning point of the division inclined cutting path R thus located, so as to form a new extended concatenated cutting path i (no increment of "i" takes place here) and then the processing is returned to step 29 and this concatenation process of the neighboring paths proceeds until no more path within a range L is found. If the vertical portions V1, V2 which are perpendicular to the division inclined cutting path R, and exist on either the end side of the division inclined cutting path R or the beginning side of the division inclined cutting path R, as shown in FIGS. 6B, 6C, preliminarily the vertical portions V1, V2 are excluded from the tool traveling path and both sides of these paths are connected directly. Because of this previous extension of the vertical portion in the cut-out data, an unnecessary travel or movement of the cutting tool over V1 or V2 will be avoided, which will serve to shorten the entire length of travel.

If it is determined that there is no division inclined cutting path R within a specified concatenation range L at step 30, the processing is returned to step 25. Then, the search is executed from the first division inclined cutting path R1 of a first scan cutting path until a first concatenated path will be formed (i being incremented by "1" at step 27) and still another concatenation process takes place at step 31.

If, on the other hand, it is determined that there is not any non-concatenated division inclined cutting path R at step 26, at step 32 it is determined whether the depth h2 exceeds the maximum depth (h max) of the scan cutting path data. If the maximum depth (h max) is not exceeded, at step 33, processing of h1=h2, where h2 is set to equal h1, is carried out and then the processing after step 23 is carried out for the next cutting stage. If the maximum depth (h max) is exceeded, this processing is terminated at step 34.

In a process in which the cutting path of the cutting tools 12, 13 is determined, if the specified concatenation range L is selected to be smaller than the width of a rib 2b formed on the division model block 2A, the division inclined cutting paths R within an area enclosed by the rib 2b are given priority with regard to being connected to each other.

If the specified depth h1 is set to be slightly i.e., within a tolerance, above the level of the thickness of the division pattern 2 (e.g., by 0.01 mm), the surface of material can be utilized as it is so that the top surface of the first stage does not have to be additionally processed.

Thus, according to the production method of the casting pattern, both the front and rear surfaces are successively processed by turning over the division model 2A after processing the front surface. When the division pattern is turned over and the rear surface thereof is machined, the stiffness holding portion 2a, left when processing of the front surface, assures a high stiffness around the through portion D. Therefore, a positional deviation of the tool while processing of the rear surface is suppressed. Additionally, though the protruding length of the cutting tool 13 is long since it is to be used in the second stage of the cutting processing, with its relatively short cutting blade length, even a division model block having a large thickness can be rapidly processed.

According to this production method of the casting pattern, the number of steps or instructions of processing is decreased as compared to the instances in which processing is made along a contour. Thus, production of processing NC data is simplified. Because the cutting processing is carried out at about 45° relative to the center lines L1, L2 of the division model block 2A, as shown in FIG. 2C, vibration which may occur when forming a thin rib 2b is suppressed.

Further, according to the production method of the casting pattern, the number of the cutting paths which travel beyond the rib 2b decreases. That is, waste processing and waste motion of the cutting tools 12, 13 are suppressed. Additionally, in a case when there are vertical portions V1, V2 which are perpendicular to the division inclined cutting path R at an end of the division inclined cutting path R or a beginning point of the division inclined cutting path R, preliminarily the vertical portions V1, V2 are removed from the tool traveling path. Thus, motion and processing of the cutting tools 12, 13 in a direction perpendicular to the division inclined cutting path R are avoided. Further, although the vertical portions V1, V2 are excluded, the side face of the rib 2b is processed with the cutting blade length when the tool is at the end/beginning point of the cutting path, thereby reducing cutting residue.

According to the aforementioned embodiment, the casting pattern 1 contains two division patterns 2, 3. However, the present invention is not restricted to this example, but the casting pattern may be of a single solid type.

The many features and advantages of the invention are apparent from the detailed specification, and thus, it is intended by the appended claims to cover all such features and advantages of the invention which fall within the true spirit and scope of the invention. Since numerous modifications and variations will readily occur to those skilled in the art, it is not desired to limit the invention to that which is exactly illustrated and described, and accordingly, all suitable modifications and equivalents may be resorted to, falling within the scope of the invention.

What is claimed:

1. A method of machining a pattern for casting having front and rear surfaces, both surfaces being subject to be machined to be a final pattern, said method comprising the steps of:

positioning the front surface of the pattern up and the rear surface down;

machining the front surface by a cutting tool to a maximum depth, said maximum depth being less than the distance between the front and rear surfaces to provide a redundant thickness portion adjacent said rear surface;

turning said pattern over after completion of machining of the front surface machining; and machining the rear surface of said pattern to profile the final pattern while at the same time entirely removing said redundant thickness portion.

2. The method of machining a pattern according to claim 1, further including the step of fixing said pattern to a fixing table to secure the pattern during the respective steps of machining the front surface and rear surface.

3. The method of machining a pattern according to claim 1, wherein said pattern has a through hole extending between the front surface and rear surface thereof.

4. The method of machining a pattern according to claim 3, wherein the step of machining one of the front and rear surfaces is conducted in multiple stages, said multiple stages comprising the steps of:

machining the surface with a first tool having a cutting blade length substantially corresponding to one-half of the entire thickness of the pattern; and subsequently machining the surface with a second tool having a cutting blade length substantially corresponding to the remaining one-half of the entire thickness of the pattern, wherein said second tool further comprises a protruding length from a chuck position thereof substantially corresponding to the entire thickness of the pattern.

5. The method of machining a pattern according to claim 1, wherein said machining tool is a numerically controlled (NC) machine and said machining process proceeds along a predetermined scanning path based on NC data along the surface of said pattern, said method further comprising the step of:

machining said surface along the scanning path extending substantially 45° relative to a center axis of said pattern.

6. The method of machining a pattern according to claim 5, further comprising the steps of:

preparing said NC data including machining tool paths for machining said pattern;

cutting out a portion of said NC data for machining said portion of said pattern having a plurality of separate paths of the cutting tool, each separate path being numbered in a predetermined order;

selecting and extending a tool travel path to form a first travel path, which is a continuous path of the separate paths, by searching and concatenating, in said order, two mutually adjacent separate paths spaced within a predetermined distance until all mutually adjacent separate paths are concatenated;

newly searching, in said order, for another separate path which has not yet been concatenated; and connecting said first travel path to the other separate path to extend the continuous travel path by providing an intermediate path which includes a retracting path from a first depth.

7. A method of machining a pattern according to claim 6, further comprising the steps of:

after determining that there is no second path which has not yet been concatenated, determining whether the continuous travel path intersects with a vertical path extending perpendicular to said path;

ending processing if a depth of said vertical path exceeds a maximum depth of said continuous travel path.

8. The method of machining a pattern according to claim 6, further comprising the steps of:

determining whether a vertical path, extending perpendicular to any of the separate paths, is present at a beginning or end point of said separate path; and deleting said vertical path from the tool traveling path so that a redundant retracting movement of said cutting tool will be avoided.

9. The method of machining a pattern according to claim 3, wherein the step of machining the front surface and the step of machining the rear surface are each conducted in multiple stages, said multiple stages of machining the front surface comprising the steps of:

machining the front surface with a first tool having a cutting blade length substantially corresponding to one-half of the entire thickness of the pattern, and subsequently machining the front surface with a second tool having a cutting blade length substantially corresponding to the remaining one-half of the entire thickness of the pattern, wherein said second tool further comprises a protruding length from a chuck position thereof substantially corresponding to the entire thickness of the pattern; and said multiple stages of machining the rear surface comprising the steps of:

machining the rear surface with a third tool having a cutting blade length equal to (i) the cutting blade length of the first tool plus (ii) the thickness of said redundant thickness portion; and subsequently machining the rear surface with said second tool.

* * * * *